(No Model.)
A. C. FITZ.
CHUCK FOR SCREW MACHINES.
No. 507,315. Patented Oct. 24, 1893.
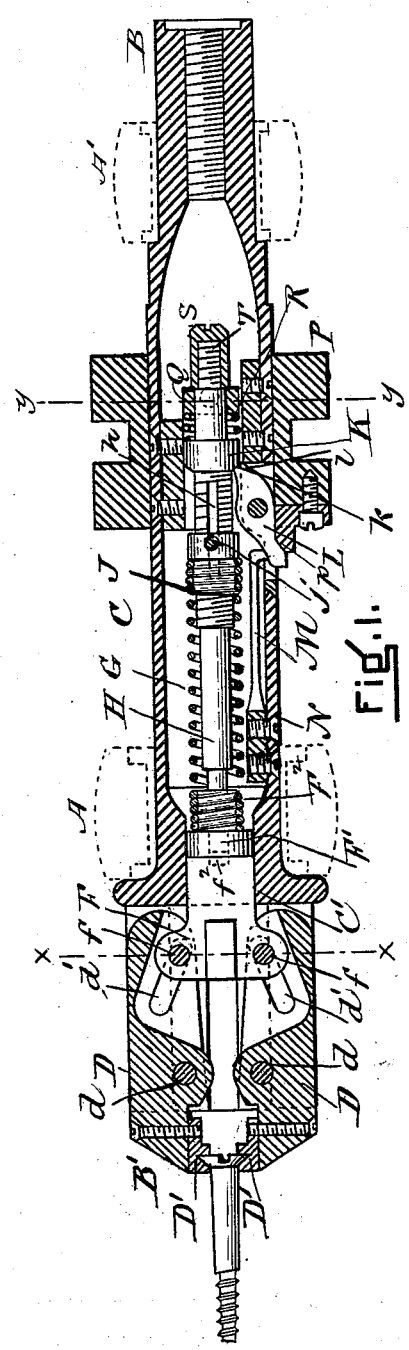
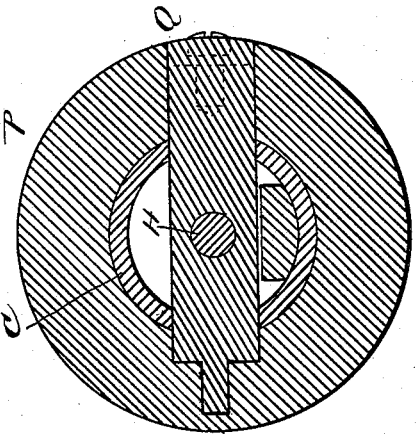
Fig. 4.
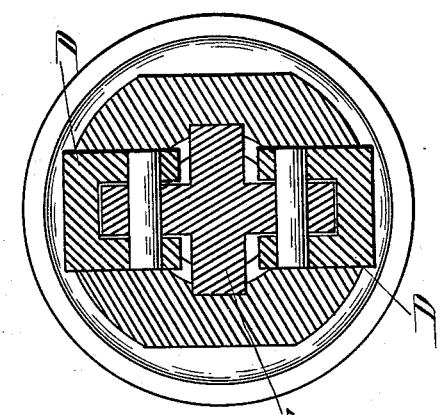
Fig. 3.
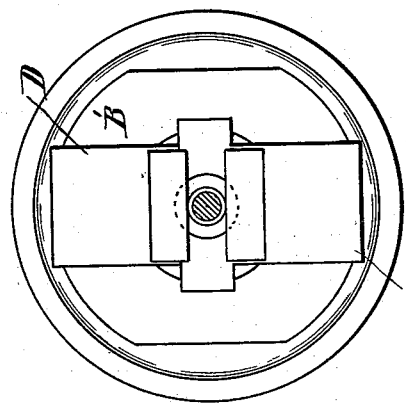
Fig. 2.
WITNESSES
Carrie M. Wiegand.
Eva A. Guild.
INVENTOR
Anos C. Fitz

UNITED STATES PATENT OFFICE.

AMOS C. FITZ, OF WORCESTER, MASSACHUSETTS.

CHUCK FOR SCREW-MACHINES.

SPECIFICATION forming part of Letters Patent No. 507,315, dated October 24, 1893.

Application filed May 4, 1893. Serial No. 473,033. (No model.)

*To all whom it may concern:*

Be it known that I, AMOS C. FITZ, of Worcester, in the county of Worcester and State of Massachusetts, have invented a new and useful Improvement in Chucks for Screw-Machines, of which the following is a specification.

My invention relates to certain details in the construction of a chuck for holding screw blanks which render it easy of adjustment, these details referring more especially to mechanism for locking and unlocking the gripping jaws by which the screw blank is to be held.

In the drawings Figure 1 is a longitudinal section partly in elevation of a chuck embodying my invention. Fig. 2 is a front elevation, Fig. 3 being a section on line $x, x$ and Fig. 4 on line $y, y$ of Fig. 1. Figs. 2, 3 and 4 are on an enlarged scale.

My chuck is adapted to be supported and rotated in two bearings indicated at A, A', and mounted in some suitable way.

C is the casing which is threaded at one end B for connection to the rotating mechanism. The other end is enlarged somewhat to form a head B', and is slotted longitudinally as shown, in order to hold the gripping jaws D. These jaws are pivoted in this head by pins $d$ and at their outer ends they are provided with detachable pieces (see D'), which are formed of proper shape to hold the screw head. The inner end of each jaw is provided with a slot $d'$ cut at an angle as shown. These gripping jaws are opened and closed by means of a traveler F, which slides in bearings formed on the interior of the casing at C', (see Fig. 3,) and which carries at its outer end two pins $f$, each of which passes through the slot $d'$ in the gripping jaws. This construction is such that when the parts are in the position shown in Fig. 1, the jaws grip the screw head, but when the traveler F is pushed forward, the pins $f$, traveling in the slots $d'$, draw the inner ends of the jaws D together and so release the screw head.

The means whereby I prefer to actuate the traveler are as follows:—The inner end of the traveler is enlarged at F' so as to center the traveler and also to form a bearing for the end of the spring. A threaded continuation F² of the traveler is provided to form a core by means of which the spring and traveler are attached together, the threads being deep enough to form a bed for the spring. A socket $f^2$ is formed in this end of the traveler and into it sets one end of the spindle rod H. About this spindle rod the spring G is wound. Near the farther end of the spindle rod H is a sleeve J, threaded like the part F² to hold the farther end of the spring. This is a convenient way to attach the ends of the spring to the parts of my device, but it is evident that other means may be adopted. The sleeve J is held in place by a set screw $j$ which passes through the collar $j'$ and enters a slot in the spindle rod H. By loosening this screw $j$ the position of the sleeve J on the spindle rod can be adjusted. The traveler is therefore pushed forward to release the jaws D by moving the spindle rod and is drawn back to tighten the grip of the jaws by means of the spring G. These movements are given to the spindle rod and spring by means of the sleeve P in the manner to be described below. When the traveler is in the position to cause the jaws to grip the screw head, as shown in Fig. 1, it may be locked in place in the following manner: A collar K is located upon the spindle rod and provided with a beveled surface $k$, which engages with a corresponding surface $l$ on a locking lever L. The outer end of this locking lever is controlled by a leaf spring M fastened to the interior of the casing at N. The free end of this spring tends to press the free end of the locking lever L against a beveled surface $p$ on a sleeve P, and consequently to keep the surfaces $k, l$ engaged. This sleeve or slide P surrounds the casing C and moves freely thereon. It is connected to the spindle rod H by means of a pin Q, which passes down through the sleeve P and through a longitudinal slot in the casing, being provided with a hole through which the spindle rod H passes. By this means the rear end of the spindle rod is always centered. Between the pin Q and the collar K is a spring R which lies around the spindle rod H and holds the pin Q and collar K apart. This arrangement of parts is such that when the sleeve P is pushed forward, the pin will take up the slack of the spring R, if there is any resistance on the part of the collar K, and in any event, will act upon the collar K to push the spindle rod forward. The strength of this spring R can be adjusted by means of the screw cap S which acts on the threaded end T of the spindle rod. The purpose of this spring is to allow the sleeve a little play so as to facilitate the unlocking of the spindle.

It is obvious that when the parts are in the position shown in Fig. 1, the spindle rod is prevented from moving forward by means of the locking lever L, the inner end of which bears against the service $k$ of the collar K, the outer end of this lever being depressed as shown by the spring M against the sleeve P. But by moving the sleeve P forward, the beveled surface $p$ strikes the corresponding surface of the lever L and lifts it so that the surface $l$ is disengaged from the surface $k$ and the spindle rod is unlocked and can be freely moved forward. In practice the sleeve may be moved by a lever, if necessary, or in any other desirable way. It is evident that in its normal position as shown in Fig. 1, the contact between the inner end of the lever L and the collar K should be light so as to allow the surface $p$ of the sleeve to act against the free end of the lever and move it without undue friction. The sleeve having been pushed forward to release the screw, and a new screw blank having been put in place, the sleeve is drawn back again and by means of the spring G, causes the withdrawal of the traveler and the consequent tightening of the gripping jaws, and the parts are relocked in the position shown in Fig. 1, the spring being locked to the traveler and the spindle rod for the purpose.

I have shown what seems to me the best and simplest way of connecting the spring G at its ends to the spindle rod and traveler, and also the simplest way of locking the jaws, but it is evident that other means may be adopted for the purpose. If slots $d'$ are made of considerable length the jaws will conform to the heads of various diameters.

One advantage of my construction is, that the axis of the chuck is free from all pins or pivots so that a chuck of fairly large size may be made hollow to allow a rod to be so held that the end will be threaded.

It is evident that in a chuck of this kind, some provision must be made for the slight inequality which exists between the heads of different screws of different sizes. It is for this reason that I have used the spring G to connect the traveler with the spindle rod. The traveler thus has a positive forward movement, because it is moved by the bottom of the spindle rod acting against the bottom of the socket in the end of the traveler and the jaws are consequently forced open. When moving to close the jaws however, the spring rod pulls the traveler. The spring being heavy, is effective for this purpose, and will only yield as the lack of exact adjustment of the gripping jaws to a particular screw head require it so to do.

What I claim as my invention is—

1. In a chuck, a casing containing a pair of gripping jaws pivoted therein, the spindle rod H and intermediate mechanism connecting said spindle rod with said jaws, the sleeve P positively connected to said spindle rod in the manner described whereby lateral movement of said spindle rod is prevented and longitudinal movement may be given thereto, all in combination with locking mechanism of substantially the kind described, adapted to engage with said spindle and lock it when said spindle is in its rearward position, all as set forth.

2. In a chuck, a casing containing a pair of gripping jaws pivoted therein, the spindle rod H and intermediate mechanism connecting said jaws with said spindle rod, the collar K mounted on said spindle rod, the lever L mounted on said casing and adapted to engage with said collar, and a sleeve P connected to said spindle rod and adapted to disengage said lever from said collar, all as set forth.

3. In a chuck of a kind described in combination, a casing, a spindle rod adapted to travel therein, locking mechanism of the kind described adapted to engage with a portion of said spindle and the sleeve P carrying the pin Q and the spring R lying between said pin and a portion of said spindle rod, all as and for the purposes set forth.

4. In a chuck containing a casing and a spindle rod H adapted to travel therein, the locking mechanism above described consisting of the locking surface $k$ connected to said spindle rod, the lever L mounted in said casing, one end of said lever being adapted to engage with said locking surface, the sleeve P carrying the pin Q and the spring R lying between said pin and a portion of said spindle rod, said sleeve being adapted to disengage said locking lever and engage with said spindle rod in the manner described, all as set forth.

In testimony whereof I have hereunto subscribed my name this 28th day of April, 1893.

AMOS C. FITZ.

Witnesses:
FRANK H. HOWE,
JAS. F. STOREY.